(12) United States Patent
Turner et al.

(10) Patent No.: US 6,198,505 B1
(45) Date of Patent: Mar. 6, 2001

(54) HIGH RESOLUTION, HIGH SPEED DIGITAL CAMERA

(75) Inventors: Elbert L. Turner, San Jose; William A. Hill, Mountain View; Dennis L. Wilson, Palo Alto, all of CA (US)

(73) Assignee: Lockheed Martin Corp., Bethesda, MD (US)

( * ) Notice: Subject to any disclaimer, the term of this patent is extended or adjusted under 35 U.S.C. 154(b) by 0 days.

(21) Appl. No.: 09/356,147

(22) Filed: Jul. 19, 1999

(51) Int. Cl.[7] .............................. H04N 5/228; G06K 9/32
(52) U.S. Cl. ............................. 348/222; 382/294
(58) Field of Search .................................. 348/234, 235, 348/236, 237, 238, 222, 584, 669, 699, 700; 382/294

(56) References Cited

U.S. PATENT DOCUMENTS

| | | | |
|---|---|---|---|
| 4,628,344 | * | 12/1986 | Glenn ..................................... 358/12 |
| 4,652,909 | * | 3/1987 | Glenn ..................................... 358/41 |
| 5,550,937 | * | 8/1996 | Bell et al. ............................. 382/294 |
| 5,963,664 | * | 10/1999 | Kumar et al. ........................ 382/294 |

\* cited by examiner

*Primary Examiner*—Wendy R. Garber
*Assistant Examiner*—Rashawn N. Tillery
(74) *Attorney, Agent, or Firm*—Kenneth W. Float

(57) ABSTRACT

A high resolution, high speed digital camera that produces a high resolution image representative of an image scene viewed by the camera. The digital camera comprises an input lens system and an iris that couple light from the image scene into the camera. A first imager generates a sequence of high resolution, low speed digital frames of the image scene. A second imager generates a sequence of low resolution, high speed digital frames of the image scene. Image processing electronics process the digital outputs of the respective imagers to register the high speed and low speed digital frames to each other, generate a vector field that describes the motion of pixels from one frame to the next in the sequence of low resolution, high speed frames, and interpolate pixels of the next frame in the sequence of high resolution, low speed frames using the vector field to translate them in the same manner as the pixels changes in the low resolution, high speed frames to produce high resolution digital frames representative of the images in a scene containing objects moving at high speed.

9 Claims, 1 Drawing Sheet

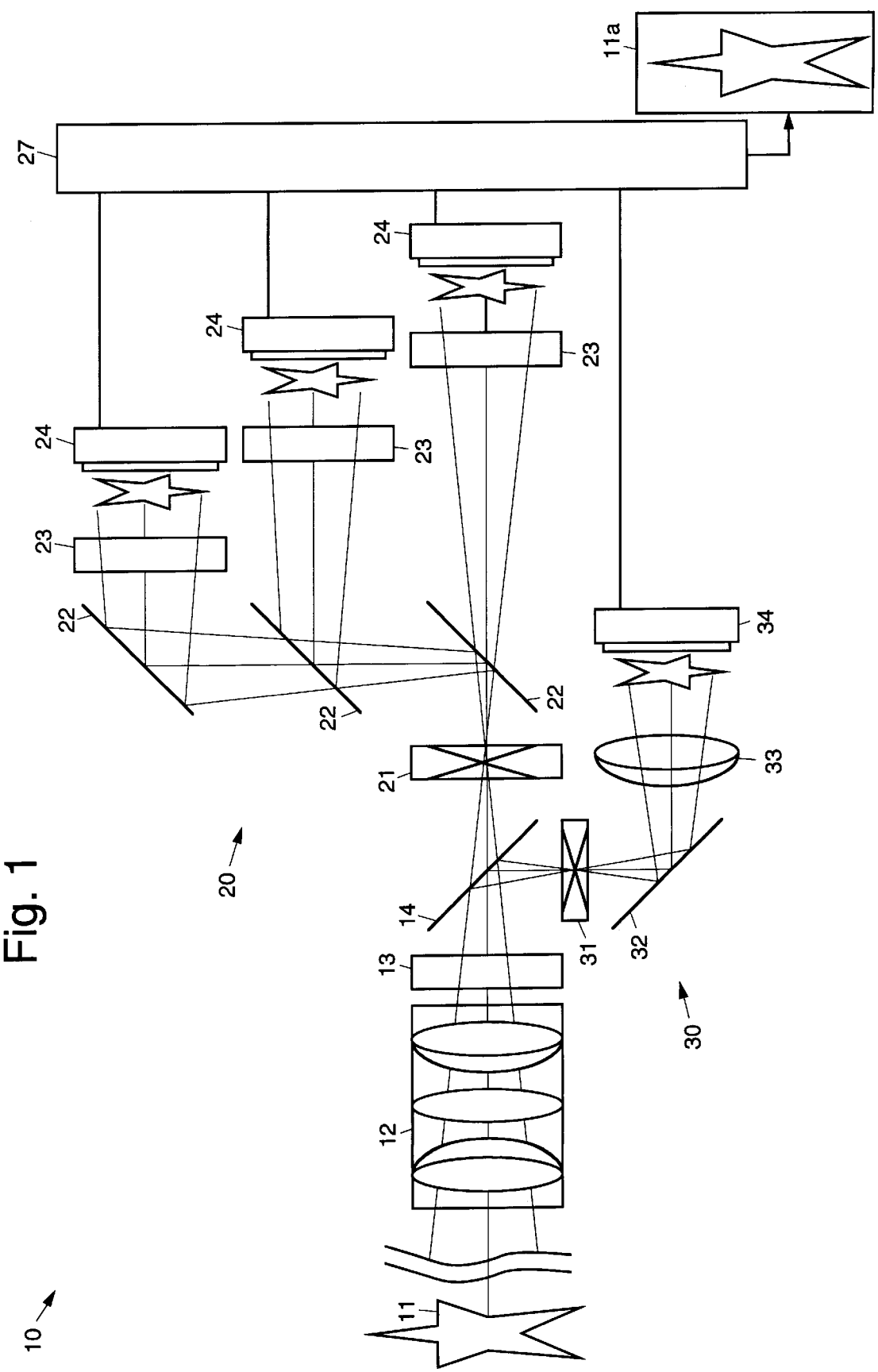

HIGH RESOLUTION, HIGH SPEED DIGITAL CAMERA

BACKGROUND

The present invention relates generally to digital cameras, and more specifically, to a high resolution, high speed digital camera for cinema and multimedia applications.

A digital camera is desirable for cinematography instead of film due to its compatibility with the growing trends in the use of digital techniques in the production of movies and other multimedia products. In addition, a digital camera provides artistic flexibility and economic benefits over the use of film cameras.

Existing digital cameras do not meet the speed and resolution requirements of the movie industry. There are high speed digital cameras with low to moderate resolution capability and there are high resolution digital cameras with low to moderate speed capabilities. However, there are none capable of both high resolution and high speed performance. Digital camera complexity is proportional to the number of pixels per frame, the number of bits per pixel, and the number of frames per second provided by the camera.

Dicomed produces single shot high resolution digital cameras. These products include the BigShot™ digital instant cameras, ScanBack™ digital scanning cameras and StudioPro™ digital scanning camera backs. Kodak produces high speed low resolution cameras including the Megaplus™ cameras that have 15, 30 and 60 frames per second frame rates with 1024 by 1024 pixel resolution.

None of these cameras meet the requirements for the movie industry. Cinematography experts in the movie industry have defined the requirements for a digital camera to have 4096 by 4096 pixel resolution, at least 10 bits digitization for each of the three primary colors, and a speed of 60 frames per second.

A conventionally designed digital camera with these characteristics would produce an output data rate in excess of 30 Gigabits per second. This data rate is at the edge of technical feasibility from a speed perspective. In addition, an expensive storage system with more than 20 Terrabytes of capacity would be required to store a typical 90 minute movie. This places a conventionally designed digital camera system at the limits of affordability and technical feasibility. However, there are economic and artistic benefits that could accrue from a system that can capture the live action in a scene in a digital format with high detail and color and in nearly real time.

Accordingly, it is an objective of the present invention to provide for a high resolution high speed digital camera for use in movie and multimedia applications that is technically realizable and is affordable. This objective will be achieved through a non conventionally designed camera that reduces the data rate and reduces the required storage capacity.

SUMMARY OF THE INVENTION

To accomplish the above and other objectives, the present invention provides for a high resolution, high speed camera that produces a high resolution digital color representation of a moving image scene viewed by the camera. The camera captures several high resolution frames per second and many more lower resolution frames per second. The data from the frames are then used to produce a sequence of high resolution picture frames at a high rate. The high resolution frames capture the fine details of the scene while the low resolution frames capture the motion of objects in the scene.

The camera comprises an input lens and shutter system that couples light from the image scene into an electro-optic imaging system located within the camera body. The electro-optic system is comprised of two types of imaging sensors. A first imaging sensor generates a digital output representing a high resolution sequence of frames of the image scene at a relatively low frame rate. A second imaging sensor generates a digital output representing a sequence of lower resolution digital frames of the image scene at a high frame rate.

The digital outputs from the two types of imaging sensors are processed by image processing electronics to produce a combined digital output that is a high speed sequence of high resolution frames of the image scene. The image processor uses the digital data from the high speed, low resolution frames to provide an interpolation of the locations of moving objects as they transition between the high resolution frames. The interpolation algorithm is used to generate intermediate high resolution frames, which are inserted between the captured high resolution frames. This results in a sequence of color imagery frames that have the full detail of the high resolution sensor as well as the motion dynamics captured by the high speed sensor.

The data generated by the camera is the sum of the data from the two sensors, which will in the order of ¼ to ¹/₁₀ of the data generated by a conventional digital camera with the same characteristics. The actual improvement is a function of the ratio of the two frame rates. This ratio is chosen to provide the desired artistic cinematic effects.

The digital camera performs very high resolution color digital imaging, at very high frame rates, on the order of 60 frames per second or more. The resolution and speed performance of the high resolution, high speed digital camera is comparable or exceeds the performance of high quality film cameras.

The digital camera provides a nearly instantaneous viewable output of captured images. The output may be examined to determine if changes to the scene are needed and a retake can be made while the set is still in place. When film is used the film processing time limits the flexibility in making these kind of instantaneous changes.

The digital camera is designed to replace film cameras for making movies and other multimedia applications. The digital camera provides the means to make a revolutionary change in the way the movie industry makes movies by eliminating film processing steps that are currently employed.

BRIEF DESCRIPTION OF THE DRAWINGS

The various features and advantages of the present invention may be more readily understood with reference to the following detailed description taken in conjunction with the accompanying drawing, which illustrates an exemplary high resolution, high speed digital camera in accordance with the principles of the present invention.

DETAILED DESCRIPTION

Heretofore, high resolution digital cameras that operate at a high frame rate have been difficult to build because of the high data output rates that are required. A representative high resolution image has on the order of 4 k×4 k pixels. Each pixel of a color image has at least 10 bits each of red, green, and blue colors. The size of the digital camera frame is (3×10 bits×16) million pixels or 480 megabits per frame. Special effects such as "slow motion" of high speed objects require cameras that operate at 60 frames per second or higher. This requires an output data rate of (60×480)=28.8 Gigabits per second for a high resolution image.

Referring to the sole drawing figure, the present invention provides for a digital camera 10 that embodies a technique that uses high resolution images recorded at a low rate to record detail in the images while using lower resolution images recorded at a high rate to record the movement of the pixels in the images. This technique provides a compromise between the effective data rates from the two types of images. When reconstructed, the sequence of high rate images produced from such an image set will have the detail of the low rate, high resolution images and the frame rate of the high rate, low resolution images.

A representative low resolution image is a 1 k by 1 k image gray scale image. Only 12 bits are required for one pixel. Each frame has 1.5 million bytes. The lower resolution gray scale images requires a data rate from the digital camera that is 49 times smaller than the large color image data rate.

Referring again to the drawing figure, it illustrates an exemplary high resolution, high speed digital camera 10 in accordance with the principles of the present invention. The exemplary high resolution, high speed digital camera 10 comprises an input lens system 12 and an iris 13 that couple light from an image scene 11 to a beam splitter 14. The beamsplitter 14 couples light from the image scene 11 along first and second paths 20, 30 to a first shutter 21 and a second high speed shutter 31, respectively.

Light transmitted by the first shutter 21 is coupled by a plurality of beam splitters 22 that separate the image along three light paths. Individual red, green and blue color filters 23 respectively disposed in the three light paths separate out the red, green and blue color spectra contained in the image. The respective images transmitted by the red, green and blue color filters 23 are imaged onto high resolution charge coupled device (CCD) imager 24 having drive electronics that produce frames referenced as image truth-frames. In the alternative, each of the high resolution CCD imagers 24 may process light from the image having different shades of gray in lieu of separate color components. The outputs of the CCD imagers 24 are input to image processing electronics 27.

Each of the high resolution CCD imagers 24 produce image truth-frames. The high resolution CCD imagers 24 have a resolution on the order of 4 k by 4 k pixels which is comparable to film resolution. However, the high resolution CCD imagers 24 only operate at about two frames per second.

Light transmitted by the second high speed shutter 31 is reflected off of a mirror 32 and imaged with a second lens system 33 onto a high speed CCD imager 34 having drive electronics that produces motion-frames. The output of the high speed CCD imager 34 are input to the image processing electronics 27.

The image processing electronics 27 processes the image truth-frames and motion-frames to produce high resolution digital image output data 11a representative of the image scene 11. The processing performed in the camera 10 is discussed in detail below.

The high resolution image are used as truth images that are updated at the low resolution CCD sensor frame rate. Each pixel in the high resolution data of a frame has a number that defines its location and color or gray scale characteristics (typically 12 bits per pixel for color). The number associated with each pixel changes when the truth-image is updated. Between updates, frames of high speed data are generated by the high speed CCD device The image processing electronics 27 interpolates between two successive truth points by using the high speed data to generate additional high resolution image frames. Thus high speed vectors associated with each pixel as data is processed added to the high resolution vectors associated with each pixel as data is processed from frame to frame.

More specifically, an exemplary camera 10 may produce high resolution frames at a rate of four per second and low resolution frames running at 60 frames per second. The combined data rate of the exemplary camera is 4×72+60× 1.5=378 megabytes per second. This data rate compares with 60×72=4310 megabytes per second from a contemporary single high resolution imager operating at 60 frames per second. This is shown in Table 1 below.

TABLE 1

Data rates for each resolution

| Image | Size MBytes | Rate Frames/Sec. | MB/Sec |
|---|---|---|---|
| Mixed Resolution Images | | | |
| 4k × 4k | 72 | 4 | 288 |
| 1k × 1k | 1.5 | 60 | 90 |
| Total | | | 378 |
| High Resolution Images | | | |
| 4k × 4k | 72 | 60 | 4320 |

The data rate for the exemplary camera is less than 10% of the data rate from a conventional digital camera.

The exemplary camera 10 produces acceptable frames at the full rate that are constructed from a sequence of mixed rate, mixed resolution frames. The construction of the high resolution, high rate frames from the mixed resolution, mixed rate frames is a relatively straightforward application of technology similar to image compression. The intermediate frames between truth-frames are generated by predicting the pixel values for each successive frame from the preceding frame. Forward prediction is used for the two frames after a truth-frame, while backward prediction is used for the two frames behind a truth-frame. The frame that is midway between two truth-frames uses a combination of forward prediction from one frame and backward prediction for the next frame.

The intermediate images are encoded by taking the difference between the predicted pixel values and the actual pixel values. The difference image has much smaller values for the difference pixels than does the original image. Consequently, the intermediate image can be expressed as a much smaller digital packet.

The effective size of the intermediate images depends on the prediction of the pixel values. The prediction is much more accurate when the motion of the pixels is taken into account. An estimate of the motion is constructed in the process of reconstructing the image sequence. The motion is used to predict the value of the next image in the sequence. The difference image is added back to the predicted image to form the reconstructed image.

The prediction of the pixel motion depends on tracking an individual pixel from one frame to the next. When the image contains moving objects, the image of the moving object moves over the image area. A vector field is generated over the area of the image indicating, for each image, the motion of the pixels as they move to form the next image in the sequence. A vector field that describes the motion of the pixels from one image to the next in the sequence is generated from the low resolution high rate images. The vector field is then used to move the pixels of the high resolution image to the appropriate locations in the next image in the sequence.

In the sequence of images shown in Table 1 there are 15 high speed frames between each of the low speed frames. The high speed frames are used to predict forward from one high resolution frame for seven frames and backward from the next high resolution frame for seven frames. The prediction for the motion carries a high resolution pixel forward or backward by not more than seven frames.

For areas of the image where there is little or no motion, the pixels move very little. For areas where there is rapid motion, the pixels move some distance. The pixels with little motion are easy to track through intermediate frames accurately. The rapid motion pixels are more difficult to track. However, the error in tracking is balanced against the blurring effect on the image that occurs when the light collected for one pixel comes from several areas due to motion. Moving objects are blurred in the high resolution image because of the motion. The errors in prediction cause blurring that is comparable to the blurring of any high resolution frame due to the motion.

The processing of the two image sets must go through several steps: (1) registration of the low resolution images to the high resolution images; (2) generation of the motion vector field at each frame time; and (3) interpolation of the pixels of the high resolution image to locations determined by the pixel motion vector field. The low resolution images must be registered to the high resolution images so that the motion of pixels of the low resolution imager can be related to motion of pixels of the high resolution image. An interpolation function with a translation forms each pixel in the next image frame.

The processing performed in the camera 10 uses a pixel motion vector field. The motion of pixels from one frame to the next is determined by a local registration of one frame compared to the next. With regard to the concept of the vector field of motion, between two frames in sequence, some of the pixels move a lot while others have much less motion. For each pixel, a vector indicates where that pixel has moved between the two frames. When the direction and magnitude of the vector are known, the pixel value for the next high resolution frame in the sequence is a translation of a pixel in the preceding image.

At the sharp transitions between moving objects and the backgrounds, the transitions are blurred because of the time required to form an individual image of a moving object. However, the human eye does not perceive detail in objects that are moving across the image. Also, when the camera 10 is panned, the edges that come into view are low resolution, corresponding to the low resolution of the high speed camera 10. The result is not noticeable because of the insensitivity of the eye during rapid motion.

The interpolation at the edges of moving objects may use information from the high speed images to form pixels that are uncovered by the moving object. Similarly, pixels that are covered by a moving object are not used in the interpolation of new pixels in the next image.

The treatment of the transition regions is different from the treatment of the general areas of the image. The definition of the transition regions is aided by finding the boundaries of objects. The process of finding such boundaries is well known. The edges are discovered by an edge finding processing. This scheme is basically a high pass filter with processing to form lines establishing the edges.

When the edge of an object is established, the treatment of pixels at that edge are adjusted depending on whether the pixel is part of the moving object or part of the background behind the moving object.

As discussed above, movement of the camera 10 results in an apparent motion of the entire scene. This motion is determined by the lowest resolution phase determination. The apparent motion is taken out of the pixel translation process easily, leaving only the relative motion of objects in the images.

Thus, a high resolution, high speed digital camera for use in film and multimedia applications has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A digital camera for producing a high resolution image representative of an image scene viewed by the camera, comprising:

a first imager for generating a sequence of high resolution, low speed digital frames of the image scene;

a second imager for generating a sequence of lower resolution, high speed digital frames of the image scene; and image processing electronics coupled to the respective imagers for registering the high speed and low speed digital images to each other, for generating a vector field that describes the motion of pixels from one frame to the next in the sequence of low resolution, high speed frames, and for interpolating pixels of the next frame in the sequence of high resolution, low speed frames using the vector field to move them in substantially the same manner as the pixels in the lower resolution, high speed frames to produce high resolution digital images representative of the image scene.

2. The camera recited in claim 1 further comprising an input lens system and an iris that couple light from the image scene into the camera.

3. The camera recited in claim 1 wherein the vector field of pixel motions between high speed frames is estimated using a decomposition technique.

4. A digital camera for producing a high resolution image representative of an image scene viewed by the camera, comprising:

a first imager for processing high resolution image frames recorded at a low rate to record detail in the image scene;

a second imager for processing lower resolution image frames recorded at a high rate to record the movement of pixels in the image scene; and image processing electronics coupled to the respective imagers for processing the high resolution and lower resolution image frames to produce a sequence of high resolution picture frames at a high rate, and wherein the high resolution image frames capture the fine details of the scene and the lower resolution image frames capture motion of objects in the scene.

5. The camera recited in claim 4 further comprising an input lens system and an iris that couple light from the image scene into the camera.

6. The camera recited in claim 4 wherein the image processing electronics uses digital data from the high speed, low resolution image frames to interpolate the locations of moving objects as they transition between the high resolution image frames.

7. The camera recited in claim 6 wherein the image processing electronics generates intermediate high resolution frames that are inserted between the high resolution frames to provide a sequence of image frames that have the high resolution detail derived from the first imager as well as motion dynamics derived from the second imager.

8. A digital camera for producing a high resolution image representative of an image scene viewed by the camera, comprising:

an input lens system and an iris that couples light from the image scene into the camera;

a beam splitter that couples light from the image scene along first and second light paths;

at least one shutter that interrupts the first and second light paths;

a plurality of beam splitters that separate the image along three light paths;

color filters respectively disposed in the three light paths separate out color spectra contained in the image a high resolution, low speed imager that produces image truth-frames disposed along each of the three light paths;

a low resolution, high speed imager that produces motion key-frames disposed along the second path; and image processing electronics coupled to the imagers for processing the image truth-frames and motion-frames to produce high resolution digital image output data representative of an image scene containing objects moving at high speed.

9. The camera recited in claim 8 wherein the image processing electronics processes the high resolution and lower resolution image frames to produce a sequence of high resolution picture frames at a high rate, and wherein the high resolution image frames capture the fine details of the scene and the lower resolution image frames capture motion of objects in the scene.

* * * * *